Figure 1:
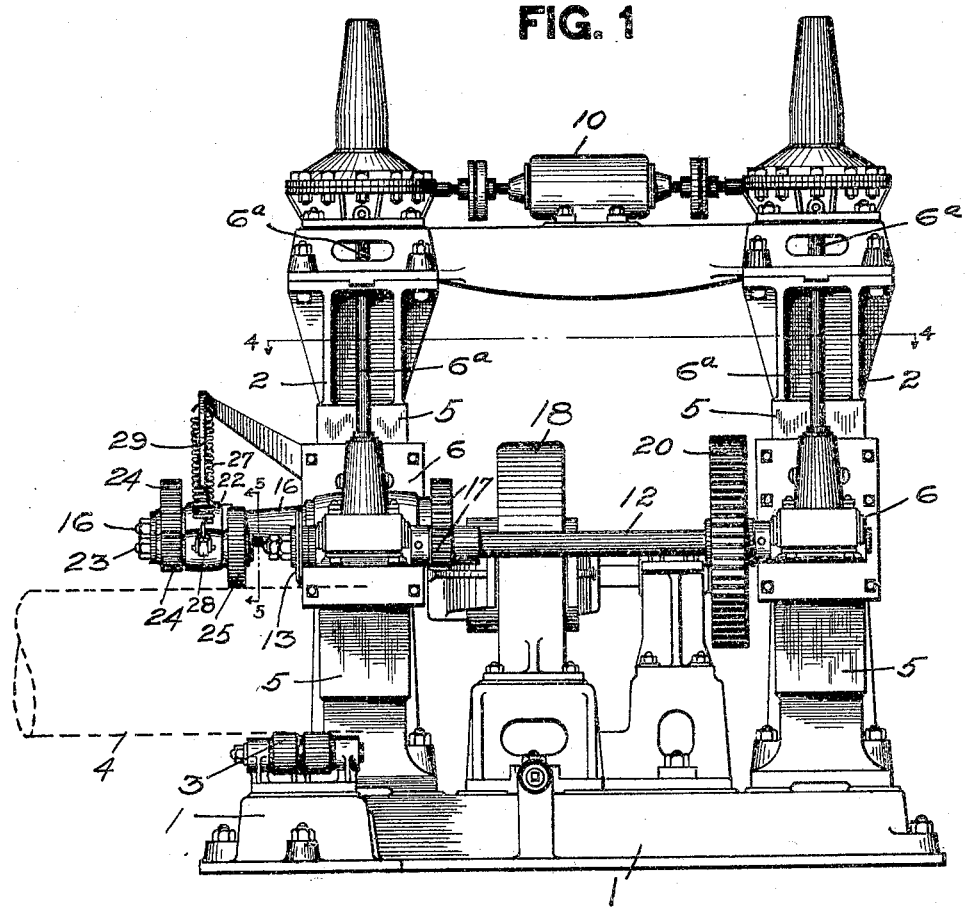

No. 794,389. PATENTED JULY 11, 1905.
J. J. BOAX.
CUTTING OFF MACHINE.
APPLICATION FILED FEB. 4, 1904.

3 SHEETS—SHEET 1.

No. 794,389. PATENTED JULY 11, 1905.
J. J. BOAX.
CUTTING OFF MACHINE.
APPLICATION FILED FEB. 4, 1904.
3 SHEETS—SHEET 2.
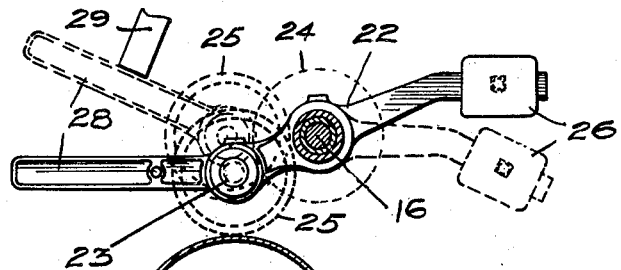
FIG. 5
FIG. 2
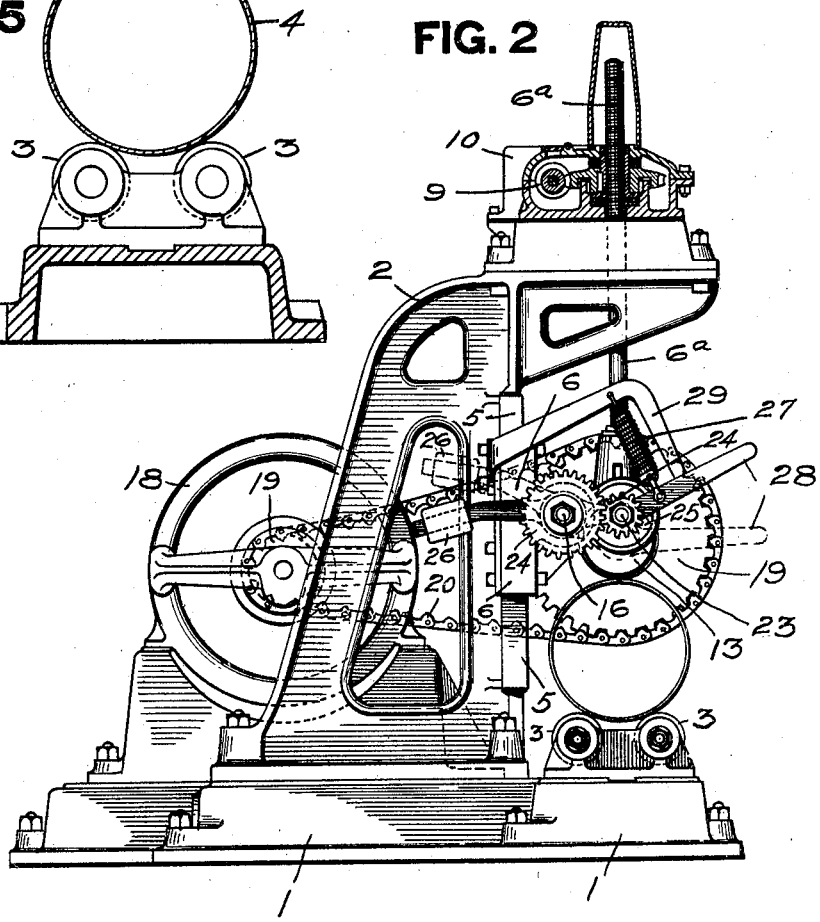
WITNESSES.
INVENTOR.

No. 794,389. PATENTED JULY 11, 1905.
J. J. BOAX.
CUTTING OFF MACHINE.
APPLICATION FILED FEB. 4, 1904.

3 SHEETS—SHEET 3.

WITNESSES.
J. R. Keller
Robert C. Totten

INVENTOR.
John J. Boax
By Kay Totten & Winter
Attorneys

No. 794,389. Patented July 11, 1905.

UNITED STATES PATENT OFFICE.

JOHN J. BOAX, OF McKEESPORT, PENNSYLVANIA, ASSIGNOR TO NATIONAL TUBE COMPANY, OF PITTSBURG, PENNSYLVANIA, A CORPORATION OF NEW JERSEY.

CUTTING-OFF MACHINE.

SPECIFICATION forming part of Letters Patent No. 794,389, dated July 11, 1905.

Application filed February 4, 1904. Serial No. 192,032.

*To all whom it may concern:*

Be it known that I, JOHN J. BOAX, a resident of McKeesport, in the county of Allegheny and State of Pennsylvania, have invented a new and useful Improvement in Cutting-Off Machines; and I do hereby declare the following to be a full, clear, and exact description thereof.

My invention relates to metal-cutting machines, and more especially to machines for cutting off large-sized metal pipes or tubes.

The object of my invention is to provide a machine for this purpose in which the feeding of the cutter against the pipe is more positive than in prior machines, which is more efficient and can be operated with less labor than prior machines for this purpose, and which provides means for positively rotating the pipe or tube, so as to bring all portions thereof under the cutter.

The form of machine most commonly used for the purpose of cutting off large-sized pipes or tubes comprises a rotating cutter which is adapted to be moved toward and from the pipe and which will not only cut through the walls thereof, but by its rotation will also serve to rotate the pipe, so as to cut all around the same. In practice, however, it is found that the cutter will put the pipe in rotation only with difficulty or only by the exertion of great pressure of the cutter on the pipe, and this has a tendency to distort or flatten the same. In practice it is necessary in order to rotate the pipe to press the cutter tightly against the pipe before starting the cutter to rotate. This results in a considerable loss of time and lessens the output of the machine. In such prior machines the cutter-spindle has been mounted in a vertically-moving head and overhangs the bearing in said head. As the spindle and bearing are comparatively short and the cutter overhangs the same heavy pressure on the latter soon results in wearing away the bearing and throwing the cutter out of a true vertical position. Furthermore, the adjustment of the cutter-carrying-spindle head toward and from the tube has heretofore been performed entirely by manual labor, and as this is a difficult operation to perform it has necessitated at times two additional workmen. The cutter-spindle was driven from a stationary motor by means of wabblers or similar connections, thus driving said spindle somewhat irregularly and subjecting the bearings to excessive wear.

The object of my invention is to provide a machine of the character just described wherein the foregoing difficulties are overcome.

To these ends the invention consists, generally stated, in providing a pair of movable heads for carrying the cutter-spindle, so as to provide two bearings for said spindle near opposite ends thereof, thus overcoming the severe wear due to the thrust of the overhanging cutter, in providing improved chain-gearing for driving said adjustable spindle from a stationary motor, in providing power mechanism for adjusting the cutter-spindle carrying-heads, and in an additional rotating friction device arranged to contact with the tube and aid the cutter in rotating same.

Figure 3:
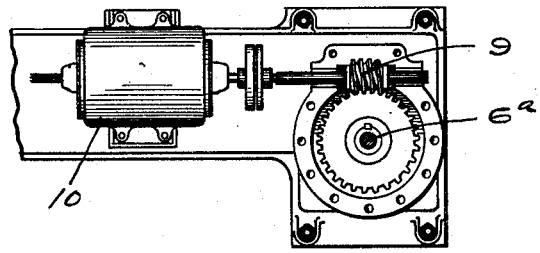
Figure 4:
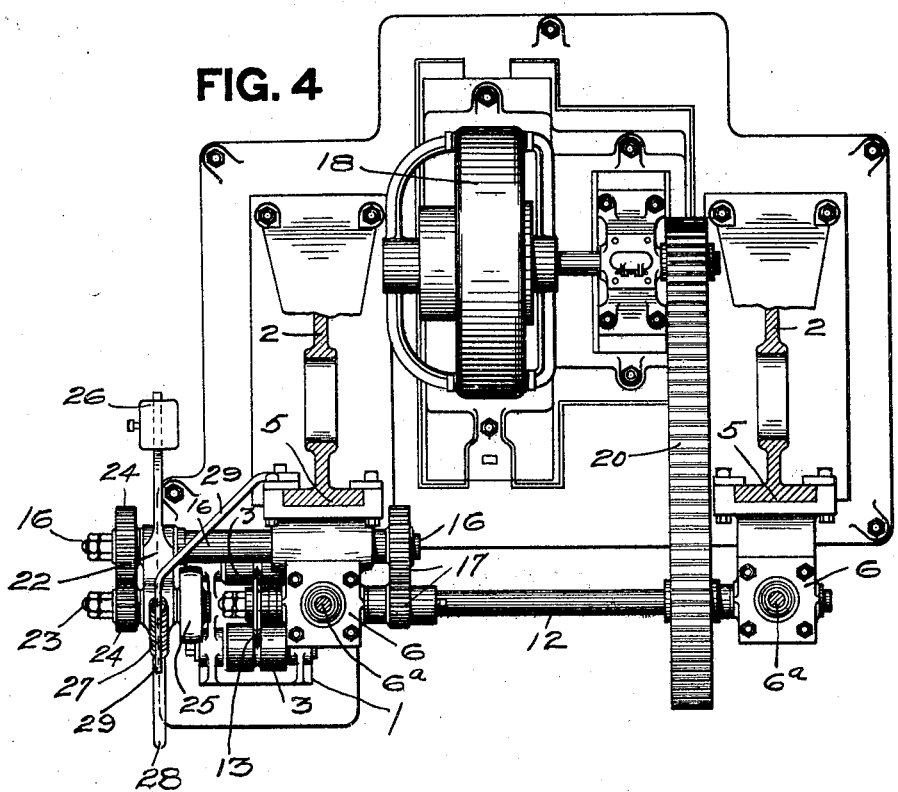

In the accompanying drawings, Figure 1 is a front elevation of my improved machine. Fig. 2 is a side view of the same, partly in section. Fig. 3 is a plan view of the screw driving means. Fig. 4 is a horizontal section on the line 4 4, Fig. 1; and Fig. 5 is a vertical section on the line 5 5, Fig. 1.

The machine comprises a suitable base 1, on which are erected vertical standards or housings 2. On the base 1 are mounted a pair of idle rollers 3, upon which the pipe 4 to be cut off is placed and upon which said pipe will rotate. The standards or housings 2 are provided with suitable vertical guideways 5, on which are slidably mounted the spindle-carrying heads 6. To the latter are connected the non-rotatable screws 6ª, which extend upwardly and pass through rotatable nuts mounted in the top of the housings. To these nuts are secured suitable gears, such as worm-wheels, with which mesh worms 9. These worms are adapted to be driven by any suitable reversing mechanism, such as the electric motor 10, by means of which the heads 6 can be raised and lowered without manual manipulation other than the starting or reversing of the motor 10, thus dispensing with the manual labor heretofore necessary in prior machines of this character.

In the heads 6 is mounted the cutter-spindle 12, this spindle being of such length as to extend from one head to the other, and thus having its bearing near the opposite ends thereof. The cutter 13 is secured to one end of this spindle and overhangs the bearing; but by reason of the length of the spindle pressure on the cutter will not tend to throw the shaft out of alinement, as in prior machines having only a single bearing for the shaft. This shaft is driven from the stationary motor 18, which may be connected to said shaft by sprocket-and-chain gearing, but preferably by a modification thereof comprising gear-wheels 19 and a chain belt 20. This form of gearing drives the shaft 16 with great smoothness and uniformity, thus resulting in the minimum amount of wear on the shaft-bearings. Also mounted in one of the heads 6, just back of the shaft 12, is a counter-shaft 16, which is driven from the shaft 12 by spur-gears 17. The shaft 16 at one end extends beyond the head 6, and loosely mounted on said extension is a swinging head or arm 22, having mounted on its outer end a short spindle 23, which is connected to the shaft 16 by the spur-gears 24, and which also carries a friction-wheel 25, which is adapted to be brought into contact with the pipe 4 in order to rotate the same. The wheel 25 normally is held elevated or out of contact with the pipe, this being accomplished by means of a counterweight 26 and spring 27. While either one alone might be used, I prefer to use both, the spring serving to prevent rattle due to the jarring of the machine; but if the spring alone were used it would have to be so strong that it would require too much strength to pull the wheel down into contact with the pipe; but by using both the spring and the counterweight I overcome rattling and at the same time lessen the power required to lower the wheel into contact with the pipe. A lever 28 is provided on the arm 22 for lowering the wheel 25 into contact with the tube, and when in its elevated position said lever presses against the stop 29, thus limiting the upward movement of the wheel.

In the use of my machine the pipe 4 to be cut off is placed on the rollers 3 in the usual manner. The heads 6 will then be lowered by means of the motor 10 until the cutter is about to contact with the pipe. The operator then pulls down the handle 28, bringing the friction-wheel 25 into contact with the pipe, and as said wheel is rotated from the shaft 16 it sets the pipe in rotation. The further lowering of the heads 6 will then bring the cutter against the pipe, and as soon as the pressure of the cutter on the pipe is sufficient to maintain it in rotation the operator will release the lever 28, thus permitting the friction-wheel to move up out of contact with the pipe. As soon as the pipe is cut off the heads 6 will be raised by the motor 10, and the operation can then be repeated on another pipe.

With my improved machine only a single operator is necessary, as he can both start, stop, and reverse the motor 10, control the motor 18, and operate the friction-wheel 25. The pipe will be rotated positively and without the necessity of bearing the cutter down on the same with the pressure necessary with the old type of machine. Furthermore, with the old type of machine it was necessary to press the cutter tightly against the pipe before starting the cutter to rotate, thus losing considerable time, which is obviated by my machine. The driving means for the cutter-spindle, furthermore, is such that such spindle will be driven with much greater smoothness than heretofore and with much less wear on the cutter-spindle bearings.

What I claim is—

1. In a pipe-cutting machine, the combination with supporting-rollers for the pipe, of a rotating cutter movable toward the pipe and arranged to cut on the exterior thereof, and a rotating friction device independent of the cutter and arranged to be brought into contact with the exterior of the pipe to rotate the same.

2. In a pipe-cutting machine, the combination with supporting-rollers for the pipe, of a rotating cutter movable toward the pipe and arranged to cut on the exterior thereof, a friction-wheel independent of the cutter and arranged to contact with the exterior of the pipe, and mechanism for rotating said wheel.

3. In a pipe-cutting machine, the combination with supporting-rollers for the pipe, of a rotating cutter movable toward the pipe and arranged to cut on the exterior thereof, a friction-wheel arranged to be moved toward the pipe, counterbalancing means for moving the same out of contact with the pipe, and mechanism for rotating said wheel.

4. In a pipe-cutting machine, the combination with supporting-rollers for the pipe, of a rotating cutter, a driven shaft, an arm pivoted thereon, a spindle mounted in said arm and geared to said shaft, and a friction-wheel on said spindle and arranged to contact with the pipe.

5. In a pipe-cutting machine, the combination with supporting-rollers for the pipe, of a cutter arranged to cut on the exterior of the pipe, a friction-wheel, a pivoted arm in which said friction-wheel is mounted and whereby it is movable toward the pipe, mechanism for rotating said friction-wheel, and counterbalancing means for moving said arm to take the wheel out of contact with the pipe.

6. In a pipe-cutting machine, the combination with supporting-rollers for the pipe, of a cutter, a driven shaft, an arm pivotally mounted thereon, a spindle mounted in said arm and geared to said shaft, a friction-wheel on said spindle and arranged to contact with the pipe, a lever for lowering said wheel, and counterbalancing means for raising said wheel.

7. In a pipe-cutting machine, the combination with supporting-rollers for the pipe, of a cutter, a pivoted arm, a spindle mounted therein, means for driving said spindle, a friction-wheel on said spindle arranged to contact with the pipe, a lever connected to said arm for lowering the same, and a counterweight and counterbalancing-spring for raising said wheel.

8. In a pipe-cutting machine, the combination with the housings, of a pair of vertically-movable heads, a spindle mounted at both ends in said heads, a cutter on said spindle and overhanging its bearings, a counter-shaft mounted in said heads and geared to said spindle, a stationary motor, and chain-gearing connecting the same and said counter-shaft.

9. In a pipe-cutting machine, the combination with supporting-rollers for the pipe, of vertically-movable heads, a cutter-spindle mounted therein, a counter-shaft also mounted in said heads and geared to said spindle, an arm pivotally mounted on said counter-shaft, a spindle mounted in said arm and geared to said counter-shaft, and a friction-wheel on said spindle arranged to be brought into contact with said pipe.

In testimony whereof I, the said JOHN J. BOAX, have hereunto set my hand.

JOHN J. BOAX.

Witnesses:
ROBERT C. TOTTEN,
G. KREMER.